Patented Jan. 12, 1954

2,665,969

UNITED STATES PATENT OFFICE 2,665,969

PURIFICATION OF ALUMINUM SULFATE LIQUORS

Robert V. Townend, Arlington, N. J., and Horace Q. Trout, Brooklyn, N. Y., assignors to Allied Chemical & Dye Corporation, New York, N. Y., a corporation of New York No Drawing. Application October 24, 1952, Serial No. 316,806

10 Claims. (Cl. 23—123)

This invention relates to purification of potassium-containing aluminum sulfate liquors and particularly to the removal of potassium therefrom by means of an ion exchange procedure.

The production of aluminum sulfate liquors by digestion of aluminous materials, for example clay, in aqueous sulfuric acid is well known. A conventional method for producing aluminum sulfate liquors involves grinding and calcining clay, followed by digesting the ground calcined clay with aqueous sulfuric acid in a tank. After effecting conversion of the clay to aluminum sulfate, the reaction mixture is diluted to about 30° Bé. and a coagulant desirably added thereto to aid in separating solid material from the liquor. Clear supernatant aluminum sulfate liquor is then withdrawn. In such production the presence of potassium in the aluminum sulfate liquors gives rise to crystallization of potassium aluminum sulfate with resulting clogging of lines and equipment and the necessity of heating the solution to dissolve the crystals. With the increasing difficulty in obtaining clay of low potassium content, this problem has become of extreme commercial importance.

Potassium may be removed from potassium-containing aluminum sulfate liquors by allowing the liquor to cool to crystallize out potassium aluminum sulfate, followed by mechanical separation of potassium aluminum sulfate prior to shipment. This procedure, however, leads to considerable loss of aluminum, and since potassium aluminum sulfate is not in sufficient commercial demand to be absorbed in the market, it presents a disposal problem.

An object of this invention is to provide a practical and economical process for removing potassium from potassium-containing aluminum sulfate liquors. More specifically, it is an object of this invention to provide a process for removing potassium from such aluminum sulfate liquors by means of an ion exchange procedure.

The invention comprises treating a potassium-containing aluminum sulfate liquor with a hydrated sodium-iron basic sulfate. Such complex basic sulfates have zeolitic properties and are insoluble or substantially so in the liquor. The potassium ions of the liquor exchange for the sodium ions of the sodium-iron basic sulfate, converting the latter to its equivalent potassium compound which is substantially free of aluminum.

In typical practice of the invention, an aluminum sulfate liquor containing potassium as an impurity is treated while being agitated and under ion exchange conditions with a hydrated sodium-iron basic sulfate. Suitable temperatures include from about 50° to about 100° C., and are preferably from about 90° to about 100° C., and suitable periods of treatment are for 2 or more hours, preferably for about 3 to about 6 hours. An exchange of potassium and sodium ions occurs, resulting in an aluminum sulfate liquor having reduced potassium content, and a solid residue of a hydrated potassium-iron basic sulfate. The solid residue is readily removed by an conventional method such as by settling and decantation or filtration. The remaining aluminum sulfate liquor, contains in place of potassium, sodium, which does not crystallize readily in the form of sodium aluminum sulfate.

Any hydrated sodium-iron basic sulfate, natural mineral or synthetically produced, may be employed in the process of this invention. A commonly known hydrated sodium iron basic sulfate is called natrojarosite, a natural mineral which has the formula,

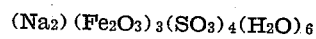

Synthetically produced hydrated sodium-iron basic sulfates have been found to vary in composition, dependent upon method of preparation. We prefer to use a synthetically produced hydrated sodium-iron basic sulfate which, exclusive of water of hydration, has the formula,

where $x$ is a number from 3 to 9, preferably not above 7, and $y$ is a number from 4 to 9. If the $Fe_2O_3$ content of the basic sulfate is above 9, we have found that use of the basic sulfate in the process of the invention becomes less economical. Further, when the $Fe_2O_3$ content is above 7, the efficiency of the basic sulfate is substantially reduced. Water of hydration of the synthetic basic sulfates may vary within wide limits, dependent to some extent upon method of drying. Generally, as the $Na_2O$ content of the compound decreases, we have found that the water of hydration tends to increase.

Synthetically produced hydrated sodium-iron basic sulfates may be prepared by the reaction of ferric sulfate with a sodium compound in which the sodium is a cationic constituent, as exemplified by sodium carbonate, sodium hydroxide and sodium sulfate.

One method for preparing a synthetic hydrated sodium-iron basic sulfate is by reaction of ferric sulfate with sodium carbonate in mol ratio of about 3 to 2, in an aqueous solution at a temperature of about 90° to about 100° C. for at least about 4 hours. After filtration and drying with an acetone wash, the resulting product has the approximate composition, $$(Na_2O)(Fe_2O_3)_5(SO_3)_7(H_2O)_{14}$$

Another method of preparing a synthetic hydrated sodium-iron basic sulfate involves reaction at a temperature of about 90° to about 100° C. of a mixture of ferric sulfate and sodium hydroxide, in molecular ratio of about 3 to 4, in aqueous solution for at least about 4 hours. After filtration and drying with an acetone wash, the resulting product has the approximate formula, $$(Na_2O)(Fe_2O_3)_{5.7}(SO_3)_{8.1}(H_2O)_{16.5}$$

Other typical synthetically produced hydrated sodium-iron basic sulfates have been found to have the following approximate formulas:

$$(Na_2O)(Fe_2O_3)_3(SO_3)_4(H_2O)_6$$
$$(Na_2O)(Fe_2O_3)_4(SO_3)_6(H_2O)_{12}$$
$$(Na_2O)(Fe_2O_3)_{6.9}(SO_3)_7(H_2O)_{19.8}$$

and $$(Na_2O)(Fe_2O_3)_{8.3}(SO_3)_{6.7}(H_2O)_{16.9}$$

It is usually advisable that the hydrated sodium-iron basic sulfate be used in such quantity that its sodium content is at least equivalent to the potassium content of the liquor undergoing treatment. To achieve minimum potassium content of the final liquor it is preferred that the sodium content of the basic sulfate be double or more the equivalent potassium content of the untreated liquor.

We have found that the process of this invention may be used to remove potassium from clay digests as well as from final aluminum sulfate liquors. Accordingly, in the specification and appended claims, use of the term, aluminum sulfate liquors, is intended to include clay digests as well as final aluminum sulfate liquors.

The following examples illustrate the invention without limiting it, the parts being by weight.

*Example 1.*—A hydrated sodium-iron basic sulfate having the approximate formula, $$(Na_2O)(Fe_2O_3)_5(SO_3)_7(H_2O)_{14}$$

was used to treat a 32° Bé. aluminum sulfate liquor containing about 0.37% K₂O as impurity in the form of potassium sulfate. When allowed to crystallize at room temperature, this liquor yielded about 2.6 parts of potassium aluminum sulfate crystals for each 100 parts of original liquor. 100 parts of the liquor were mixed with 5.4 parts of the sodium-iron basic sulfate. This amount of basic sulfate was calculated to be the theoretical quantity necessary to replace all the potassium present in the liquor. The mixture was refluxed at a temperature of about 100° C. for 4 hours and filtered. The weight of the liquor was then adjusted to 100 parts by addition of water and the liquor allowed to stand 48 hours at approximately 23° C. About 0.89 part of potassium aluminum sulfate crystallized out, showing a removal of about 0.17% K₂O, or about 46% of the original potassium present.

*Example 2.*—A hydrated sodium-iron basic sulfate prepared by the reaction of Fe₂(SO₄)₃ with sodium sulfate and having the approximate formula, $$(Na_2O)(Fe_2O_3)_4(SO_3)_6(H_2O)_{12}$$

was used to treat a 32° Bé. aluminum sulfate liquor containing approximately 0.3% K₂O as impurity in the form of potassium sulfate. When permitted to crystallize at room temperature, this liquor gave about 2.8 parts of potassium aluminum sulfate crystals for each 100 parts of original liquor. 100 parts of the liquor were refluxed at a temperature of about 100° C. with 4.5 parts of the basic sulfate. At the end of 4 hours the solid was separated by filtration and the clear liquor allowed to crystallize. About 1.3 parts of potassium aluminum sulfate crystals were obtained from 100 parts of the clear liquor, showing a removal of about 0.15 part of K₂O, i. e. about 50% of the original potassium present.

In another run 100 parts of the same aluminum sulfate liquor were treated with 9 parts of the same hydrated sodium-iron basic sulfate in the manner described above. The quantity of basic sulfate employed represented about twice the theoretical amount required to replace all of the potassium present. In this case only about 0.3 part of potassium aluminum sulfate crystals was obtained, showing a removal of about 0.25 part of K₂O, or about 83% of the original potassium present.

*Example 3.*—A standard clay digest was carried out on 28 parts of calcined clay containing about 1.7 percent K₂O. The clay was refluxed at about 100° C. with 70 parts of 42% aqueous sulfuric acid for three hours. At the conclusion of the digest, 8.4 parts of a hydrated sodium-iron basic sulfate prepared by the reaction of Fe₂(SO₄)₃ with sodium sulfate and having the approximate formula, $$(Na_2O)(Fe_2O_3)_4(SO_3)_6(H_2O)_{12}$$

were added. This amount of basic sulfate was calculated to have a sodium content equivalent to the potassium content of the clay. The digestion was continued for two additional hours under reflux at about 100° C., and clear liquor was recovered by filtration. After diluting with water to 31° Bé., the liquor was allowed to stand at 20° C. for 64 hours, and no crystals of potassium aluminum sulfate were obtained.

A digest carried out in exactly the same manner as above but without the addition of the sodium-iron basic sulfate yielded on standing at about 23° C. about 1.5 parts of potassium aluminum sulfate for each 100 parts of clear liquor.

In each of the foregoing examples, there was no or substantially no pick-up of iron by the aluminum sulfate liquor as result of the ion exchange treatment.

While all examples of the invention have been described for the purpose of illustration, it should be understood that various modifications and adaptions thereof may be made without departing from the spirit of the invention as set forth in the appended claims.

We claim:

1. A process for the removal of potassium from aluminum sulfate liquors containing potassium comprising subjecting the liquor to the zeolitic action of a hydrated sodium-iron basic sulfate.

2. The process of claim 1 wherein the hydrated sodium-iron basic sulfate has the following formula, exclusive of water, $$(Na_2O)(Fe_2O_3)_x(SO_3)_y$$

where $x$ is a number from 3 to 9 and $y$ is a number from 4 to 9.

3. The process of claim 1 wherein the hydrated sodium-iron basic sulfate has the following formula, exclusive of water, $$(Na_2O)(Fe_2O_3)_x(SO_3)_y$$

where $x$ is a number from 3 to 7 and $y$ is a number from 4 to 9.

4. A process for the removal of potassium from aluminum sulfate liquors containing potassium comprising subjecting the liquor to the zeolitic action of a hydrated sodium-iron basic sulfate prepared by interaction of ferric sulfate with a sodium compound in which the sodium is a cationic constituent.

5. A process for the removal of potassium from aluminum sulfate liquors containing potassium comprising subjecting the liquor to the zeolitic action of a hydrated sodium-iron basic sulfate prepared by interaction of ferric sulfate with a sodium compound selected from the group consisting of sodium carbonate, sodium hydroxide and sodium sulfate.

6. A process for the removal of potassium from aluminum sulfate liquors containing potassium comprising subjecting the liquor to the zeolitic action of a hydrated sodium-iron basic sulfate prepared by reacting ferric sulfate with sodium carbonate, in mol ratio of about 3 to 2, in aqueous solution at a temperature of about 90° to about 100° C. for at least about 4 hours, separating the resulting basic sulfate product and drying said product.

7. A process of removing from aluminum sulfate liquors, potassium, which tends to form insoluble potassium aluminum sulfate complexes, comprising treating the liquor containing potassium under ion exchange conditions with a hydrated sodium-iron basic sulfate in quantity such that its sodium content is at least equivalent to the potassium content of the liquor undergoing treatment, said basic sulfate having the following formula, exclusive of water, $$(Na_2O)(Fe_2O_3)_x(SO_3)_y$$

where $x$ is a number from 3 to 7 and $y$ is a number from 4 to 9.

8. A process for the removal of potassium from aluminum sulfate liquors containing potassium comprising treating the liquor with a hydrated sodium-iron basic sulfate at a temperature of about 50° to about 100° C. for at least 2 hours to bring about an ion exchange reaction between the potassium component of the aluminum sulfate liquor and the sodium component of the sodium-iron basic sulfate.

9. A process for the removal of potassium from aluminum sulfate liquors containing potassium comprising treating the liquor with a hydrated sodium-iron basic sulfate having the approximate formula, $$(Na_2O)(Fe_2O_3)_5(SO_3)_7(H_2O)_{14}$$

at a temperature of about 90° to about 100° C. for about 3 to about 6 hours to bring about an ion exchange reaction between the potassium component of the aluminum sulfate liquor and the sodium component of the sodium-iron basic sulfate, the quantity of basic sulfate employed being such that its sodium content is at least equivalent to the potassium content of the liquor undergoing treatment.

10. A process for the removal of potassium from aluminum sulfate liquors containing potassium with comprises treating the liquor with a hydrated sodium-iron basic sulfate having the approximate formula, $$(Na_2O)(Fe_2O_3)_5(SO_3)_7(H_2O)_{14}$$

at a temperature of about 90° to about 100° C. for about 3 to about 6 hours to bring about an ion exchange reaction between the potassium component of the aluminum sulfate liquor and the sodium component of the sodium-iron basic sulfate, the quantity of basic sulfate employed being such that its sodium content is at least double the equivalent potassium content of the untreated liquor, and then separating the solid material from the clear liquor.

ROBERT V. TOWNEND.
HORACE Q. TROUT.

No references cited.